(12) United States Patent
Keating

(10) Patent No.: US 11,361,795 B2
(45) Date of Patent: Jun. 14, 2022

(54) DATA BUFFER AND DATA BUFFER CONTROL

(71) Applicant: Sony Corporation, Tokyo (JP)

(72) Inventor: Stephen Mark Keating, Berkshire (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/971,506

(22) PCT Filed: Feb. 15, 2019

(86) PCT No.: PCT/GB2019/050407
§ 371 (c)(1),
(2) Date: Aug. 20, 2020

(87) PCT Pub. No.: WO2019/166771
PCT Pub. Date: Sep. 6, 2019

(65) Prior Publication Data
US 2020/0402535 A1 Dec. 24, 2020

(30) Foreign Application Priority Data
Feb. 28, 2018 (GB) ...................................... 1803249

(51) Int. Cl.
*G11B 20/10* (2006.01)
*H04N 21/439* (2011.01)
(Continued)

(52) U.S. Cl.
CPC ... *G11B 20/10527* (2013.01); *H04N 21/4392* (2013.01); *H04N 21/44004* (2013.01); *G11B 2020/10712* (2013.01)

(58) Field of Classification Search
USPC .................................. 386/200–234, 343–352
See application file for complete search history.

(56) References Cited

U.S. PATENT DOCUMENTS 6,247,072 B1 6/2001 Firestone
7,023,488 B2 4/2006 Szybiak et al.
(Continued)

FOREIGN PATENT DOCUMENTS

CN 101084678 A 12/2007

OTHER PUBLICATIONS

"AIMS Guidelines to Preparing Broadcast Facilities for IP-Based Live TV Production Key Points Relative to Designing for Operations in All Studio Environments," Alliance for IP Media Solutions, Apr. 2017, pp. 1-20.
International Search Report dated May 29, 2019 in PCT/GB2019/050407 filed Feb. 15, 2019.

*Primary Examiner* — Hung Q Dang
(74) *Attorney, Agent, or Firm* — Oblon, McClelland, Maier & Neustadt, L.L.P.

(57) ABSTRACT

Control apparatus to control operation of a data buffer to which data items are written according to a write pointer which advances in position in response to an input data item rate and from which data items are read according to a read pointer which advances in position in response to an output data item rate, comprises: a detector configured to detect an occupancy difference between a current buffer occupancy and a target buffer occupancy, in which the current buffer occupancy represents a difference between the read and write pointers; an output data item interpolator configured to interpolate a data item at an interpolated data buffer location displaced by a read offset displacement from a data buffer location pointed to by the read pointer; and output control circuitry configured, in response to a current occupancy difference exceeding a threshold occupancy difference, to change the read pointer from an initial read pointer to a target read pointer by a change amount so as to reduce the occupancy difference, the output control circuitry being configured to progressively vary the read offset displace-
(Continued)

ment so as to define an interpolated data buffer location which progresses over the output of a transitional group of data items towards the location pointed to by the target read pointer; the output control circuitry being further configured, when the occupancy difference is less than the threshold occupancy difference and the interpolated data buffer location is aligned with the target read pointer, to inhibit operation of the output data item interpolator and to control output of an output data item from the data buffer location pointed to by the read pointer.

18 Claims, 14 Drawing Sheets

(51) Int. Cl.
*H04N 21/44* (2011.01)
*H04L 7/00* (2006.01)
*G06F 5/06* (2006.01)

(56) References Cited

U.S. PATENT DOCUMENTS

| | | | |
|---|---|---|---|
| 7,519,747 | B1 | 4/2009 | Cory et al. |
| 8,311,094 | B2 | 11/2012 | Kamariotis et al. |
| 8,650,238 | B2 | 2/2014 | Ramakrishnan et al. |
| 8,917,797 | B2 | 12/2014 | Faller |
| 9,324,336 | B2 | 4/2016 | Kang et al. |
| 2005/0141033 | A1 | 6/2005 | Nishioka |
| 2006/0285557 | A1 | 12/2006 | Anderton et al. |
| 2007/0008984 | A1 | 1/2007 | Philips et al. |
| 2012/0268653 | A1* | 10/2012 | Diggins ............... H04N 7/0105 348/452 |
| 2013/0107930 | A1 | 5/2013 | Le Faucheur et al. |
| 2013/0235152 | A1* | 9/2013 | Hannuksela ........... H04N 19/70 348/43 |
| 2015/0200771 | A1 | 7/2015 | Le-Faucheur et al. |
| 2017/0070363 | A1* | 3/2017 | Watkins ................. H04L 69/32 |

* cited by examiner

| | | 600 | | | | | | | | 610 | 620 | | |
|---|---|---|---|---|---|---|---|---|---|---|---|---|---|
| (504) Wr Pointer | +1 | +1 | +1 | +1 | +1 | ... | +1 | +1 | +1 | +1 | +1 | +1 | +1 |
| (506) Rd Pointer | +1 | +1 | +1 | +1 | +1 | ... | +1 | +1 | +1 | +2 | +1 | +1 | |
| (512) | 63 | 64 | 64 | 64 | 64 | ... | 64 | 64 | 64 | 64 | 63 | 63 | |
| (516) | 0 | 1 | 1 | 1 | 1 | ... | 1 | 1 | 1 | 1 | 0 | 0 | |
| (528) | 0 | 1 | 2 | 3 | 4 | ... | 1022 | 1023 | 1024 | | 0 | 0 | |
| SGN (518) | 0 | 0 | 0 | 0 | 0 | ... | 0 | 0 | 0 | | 0 | 0 | |
| OVF (530) | 0 | 0 | 0 | 0 | 0 | ... | 0 | 0 | 0 | | 0 | 0 | |
| (526) | 0 | 0 | 1 | 2 | 3 | 4 | ... | 1022 | 1023 | 1 | 0 | 0 | 0 |
| (524) | 0 | 0 | 0 | 0 | 0 | 0 | ... | 0 | 0 | 1023 | 0 | 0 | 0 |

FIG. 6

| (504) Wr Pointer | +1 | +0 {800} | +1 | +1 | +1 | ... | +1 | +1 | +1 | +1 | +1 {810} |
|---|---|---|---|---|---|---|---|---|---|---|---|
| (506) Rd Pointer | +1 | +1 | +0 | +1 | +1 | ... | +1 | +1 | +1 | +1 | +1 |
| (512) | -63 | -64 | -63 | -63 | -63 | ... | -63 | -63 | -63 | -63 | -63 |
| (516) | 0 | -1 | 0 | 0 | 0 | ... | 0 | 0 | 0 | 0 | 0 |
| (528) | 0 | fff | 3fe | 3fd | 3fc | ... | 3 | 2 | 1 | 0 | 0 |
| SGN (518) | 1 | 1 | 1 | 1 | 1 | ... | 1 | 1 | 1 | 1 | 1 |
| OVF (530) | 0 | 1 | 0 | 0 | 0 | ... | 0 | 0 | 0 | 0 | 0 |
| (524) | 0 | 0 | -1 | -1 | -1 | ... | -1 | -1 | -1 | 0 | 0 |
| Rd Shift (526) | 0 | 0 | 1023 | 1022 | 1020 | ... | 4 | 3 | 2 | 1 | 0 |

FIG. 8a

| | 820 | | | | | | 830 | | | | | | |
|---|---|---|---|---|---|---|---|---|---|---|---|---|---|
| Wr Pointer | +1+1 | +1 | +1 | +1 | +1 | +1 | +0 | +1 | +1 | +1 | +1 | +1 | +1 |
| Rd Pointer | +1 | +1 | +1 | +1 | +1 | +1 | +1 | +1 | +1 | +1 | +2 | +1 | +1 |
| A | 63 | 64 | 64 | 64 | 64 | 63 | 63 | 63 | 63 | 63 | 63 | 62 | 62 |
| B | 0 | 1 | 1 | 1 | 1 | 0 | 0 | 0 | 0 | 0 | 0 | 0 | 0 |
| C | 0 | 1 | 2 | 3 | 4 | 5 | 6 | ... | 1022 | 1023 | 1024 | 0 | 0 |
| SGN | 0 | 0 | 0 | 0 | 0 | 0 | 0 | ... | 0 | 0 | 0 | 0 | 0 |
| OVF | 0 | 0 | 0 | 0 | 0 | 0 | 0 | ... | 0 | 0 | 1 | 0 | 0 |
| Rd Shift | 0 | 0 | 1 | 2 | 3 | 4 | 5 | 6 | 1022 | 1023 | 1 | 0 | 0 |
| D | 0 | 0 | 0 | 0 | 0 | 1 | 1 | 1 | 1 | 1 | 1 | 0 | 0 |

FIG. 8b

DATA BUFFER AND DATA BUFFER CONTROL

BACKGROUND

Field of the Disclosure

This disclosure relates to data buffers and data buffer control.

Description of the Prior Art

In the context of a data buffer such as an audio buffer to which data items are written according to a write pointer which advances in position in response to an input data item rate and from which data items are read according to a read pointer which advances in position in response to an output data item rate, current buffer occupancy represents a difference between the read and write pointers.

To avoid data overflow or underflow, a target buffer occupancy may be specified, an occupancy difference between a current buffer occupancy and a target buffer occupancy can be detected. In response to the occupancy difference exceeding a threshold, it is possible to drop or repeat output data items from the data buffer. However, such a coarse adjustment can give rise to discontinuities in the output data stream, which can be a particular problem if the data items represent, for example, audio samples.

Another approach is interpolation amongst output data items, but this can also give rise to noise and/or distortion.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 6 to 8*a*, 8*b* schematically illustrate data states in the apparatus of FIG. 5;

DESCRIPTION OF THE EMBODIMENTS

Figure 1:
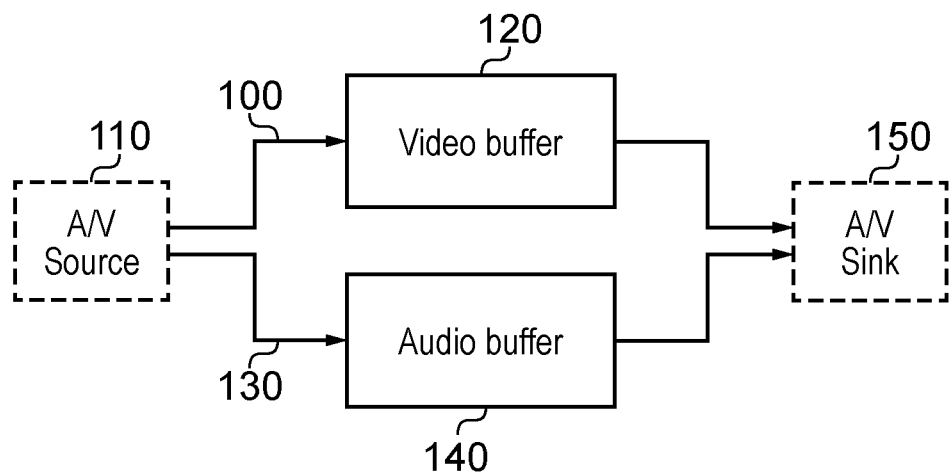
FIG. 1 schematically illustrates a video and audio buffer arrangement.

Referring to the drawings, FIG. 1 schematically illustrates a video and audio buffer arrangement in which video data 100 from an audio/video (A/V) source 110 is buffered by a video buffer 120 and audio data 130 from the A/V source is buffered by an audio buffer 140, before both the audio and video data are supplied from the respective buffers to an A/V sink 150.

Different respective buffers are used for the video and audio data, in part because of differences in properties of these types of data. For example, in order to deal with a video buffer becoming either too full or insufficiently full, for example because of data rate discrepancies between the rate at which data is written to the buffer and the rate at which data is read from the buffer, it is generally necessary to skip a video frame or repeat a video frame, because temporal interpolation between video frames for rate conversion is relatively processor-intensive and can degrade the video quality. In contrast, for the audio buffer 140, a simple approach to dealing with data rate discrepancies between audio data 130 provided to the audio buffer and the audio data read out from the audio buffer is to skip or repeat samples on a sample-by-sample basis.

The present embodiments will discuss the handling of rate discrepancies on a sample-by-sample basis. While an audio buffer is used as an example, the present techniques are applicable to a buffer for any sample-based data for which inter-sample interpolation provides a meaningful outcome—for example, a buffer of samples indicating temperature measurements, a buffer of samples indicating voltage detections or the like.

As mentioned above, issues relating to an insufficiently full buffer or an over-full buffer can arise because of discrepancies between the data rate of data items supplied to the respective buffer and the data rate at which data items are required from the data buffer. In the case of audio data, for example, there may be a nominal data rate of, for example, 48000 samples per second or 44100 samples per second. Indeed, this nominal data rate could be the same as between the A/V source 110 and the A/V sink 150, but normal tolerances in, for example, crystal-controlled oscillators controlling operations at the respective devices can lead to minor discrepancies between the data rate at inputs to the audio buffer 140 and the data rate at output from the audio buffer 140.

FIG. 1 therefore provides an example of a buffer in which the input data item rate is defined by an input clock signal and the output data item rate is defined by an output clock signal.

Figure 2:
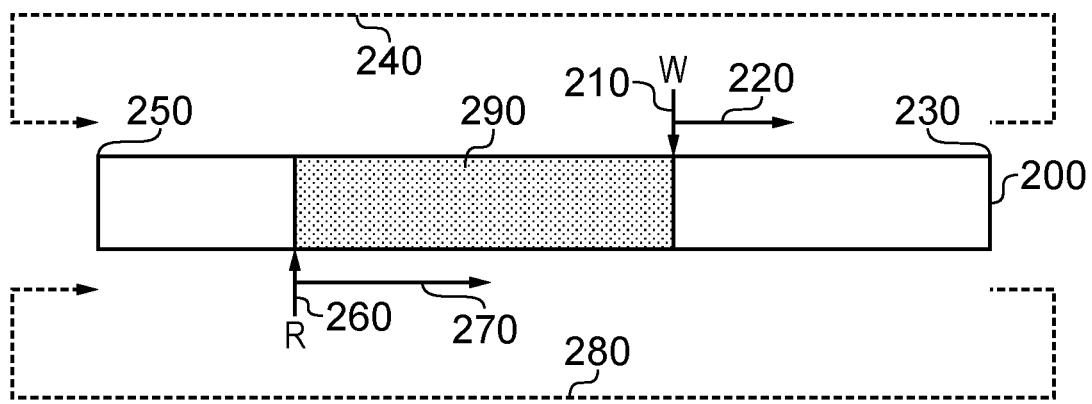
FIG. 2 schematically illustrates the use of read and write pointers.

FIG. 2 schematically illustrates the use of read pointers and write pointers in the context of a buffer such as the audio buffer 140. The buffer is arranged as a portion 200 of memory in which newly received data items (for example, audio samples) are written at a write pointer position 210. When a data item has been written to the memory 200, the write pointer advances in position, for example in a direction 220. When the write pointer reaches the end 230 of the memory 200, it returns on a cyclic basis (shown schematically by a path 240) to the other end 250 of the memory 200 so as to overwrite the previously-written data items.

A read pointer 260 follows the write pointer in the direction 220 and indicates a location at which data is read from the buffer. As a data item is read, the read pointer advances in position in a direction 270, or in other words the same direction as the direction 220, once again taking a cyclic path 280 back to the start 250 of the memory 200 when it reaches the end 230.

The region 290 between the prevailing read pointer and the prevailing write pointer is a region in which currently unread data is held, and represents the current occupancy of the data buffer.

For a reliably operating system, the current occupancy ideally sits at a target occupancy level, which may be (purely by way of example) equivalent to 50% of the size of the memory 200. If the buffer occupancy drops too low, there is a danger that the buffer will run out of data and will be unable to service read operations as they are required. On the other hand, if the buffer occupancy grows too large, there is a danger that the size of the buffer 200 may be insufficient and the buffer will overfill, causing data to be discarded at the input side.

One way in which the occupancy of a data buffer could be managed is by controlling the rate of writing to and reading from the data buffer. However, since the rate of writing to the data buffer may be outside the control of the buffer arrangement in use (for example, being determined by the data output rate of a potentially remote piece of apparatus such as the A/V source 110), a way in which local control of the buffer occupancy can be achieved is to control the rate at which data is read out from the buffer. The example arrangements discussed below deal with controlling the reading of data from a data buffer.

Figure 3:
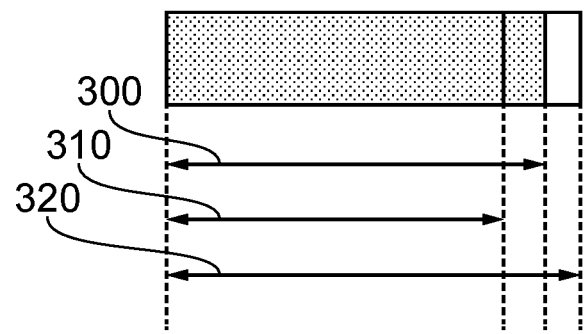
FIG. 3 schematically illustrates a buffer occupancy margin.

FIG. 3 schematically illustrates a buffer occupancy margin relevant to the discussions below, in the sense that although a particular buffer occupancy 300 is considered as a target buffer occupancy, an acceptable margin or tolerance can be defined either side of the target buffer occupancy 300 so that variations in buffer occupancy are tolerated as long as the buffer occupancy does not go below a lower limit 310 or above an upper limit 320. In the examples discussed below, which relate to audio samples, the margin may be 64 audio samples either side of the target buffer occupancy 300 so that the lower threshold 310 is equal to the target buffer occupancy minus 64 samples and the upper threshold 320 is equal to the target buffer occupancy plus 64 samples. However, different margins can of course be used.

It will be appreciated that in terms of the comparison of a value such as a current occupancy difference (between a current buffer occupancy and a target buffer occupancy) with a threshold such as a margin, various entirely equivalent formulations can be used. In the present case using an example margin of 64, the following are entirely equivalent at a technical level:

| Current occupancy difference > 63 | Current occupancy difference >= 64 |
|---|---|

And similarly the following are entirely equivalent at a technical level

| Current occupancy difference < 64 | Current occupancy difference <= 63 |
|---|---|

The skilled person will fully realise that references to comparison with a threshold can refer to either equivalent statement as set out above.

Figure 4:
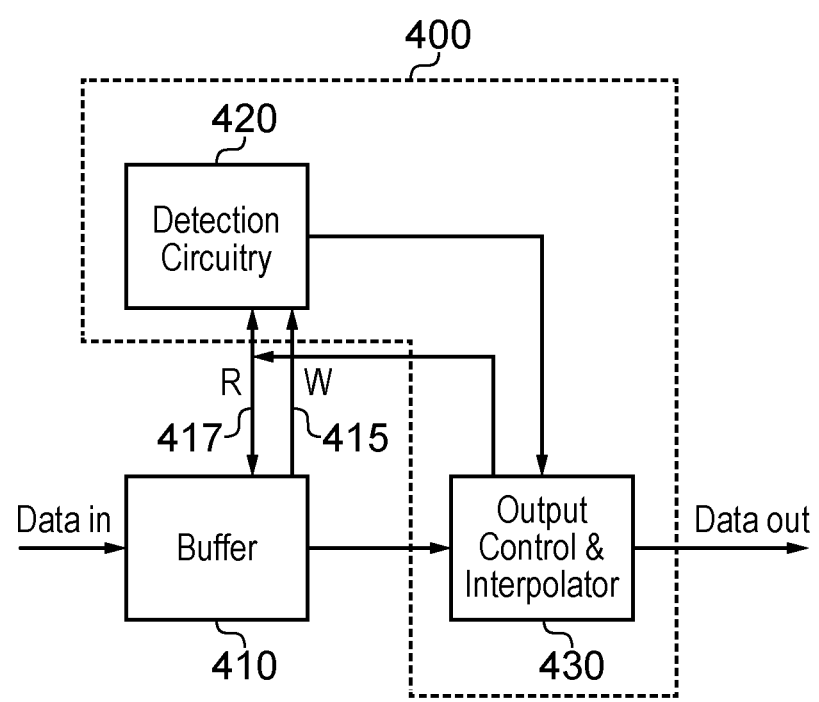
FIG. 4 schematically illustrates a buffer control apparatus.

FIG. 4 schematically illustrates a buffer control apparatus 400 to control operation of a data buffer 410 to which items are written (according to a write pointer 415 which advances in position in response to an input data item rate) and from which data items are read (according to a read pointer 417 which advances in position in response to an output data item rate).

The operation of the apparatus 400 will be discussed in greater detail below, but in brief, the apparatus 400 comprises detection circuitry 420 configured to detect an occupancy difference between a current buffer occupancy and a target buffer occupancy in which the current buffer occupancy represents (as discussed above) a difference between the read and write pointers. The apparatus 400 also comprises output control circuitry which can control the advance of the read pointer and an interpolator 430. The operation of the output control and interpolation circuitry will be discussed in more detail below.

FIG. 4 therefore provides an example of control apparatus 400 to control operation of a data buffer 410 to which data items are written according to a write pointer which advances in position in response to an input data item rate and from which data items are read according to a read pointer which advances in position in response to an output data item rate, the apparatus comprising:

a detector 420 configured to detect an occupancy difference between a current buffer occupancy and a target buffer occupancy, in which the current buffer occupancy represents a difference between the read and write pointers;

an output data item interpolator 430 configured to interpolate a data item at an interpolated data buffer location displaced by a read offset displacement from a data buffer location pointed to by the read pointer; and output control circuitry 430 configured, in response to a current occupancy difference exceeding a threshold occupancy difference, to change the read pointer from an initial read pointer to a target read pointer by a change amount so as to reduce the occupancy difference, the output control circuitry being configured to progressively vary the read offset displacement so as to define an interpolated data buffer location which progresses over the output of a transitional group of data items towards the location pointed to by the target read pointer;

the output control circuitry being configured, when the occupancy difference is less than the threshold occupancy difference and the interpolated data buffer location is aligned with the target read pointer, to inhibit operation of the output data item interpolator and to control output of an output data item from the data buffer location pointed to by the read pointer.

FIG. 4 therefore also shows an example of data buffer apparatus comprising:

a data buffer 410; and control apparatus 400 to control operation of the data buffer.

Figure 5:
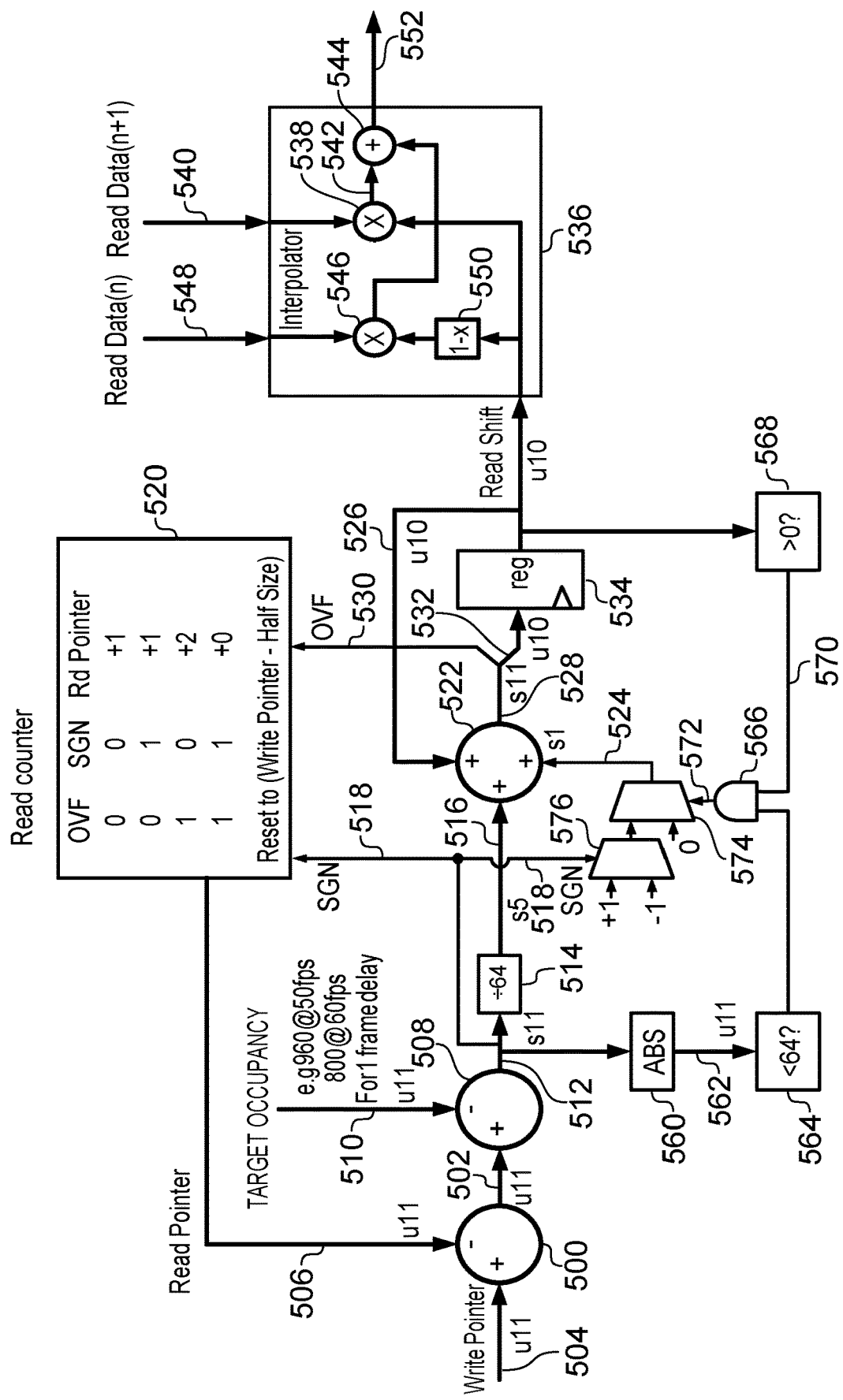
FIG. 5 schematically illustrates the apparatus of FIG. 4 in more detail.

FIG. 5 schematically illustrates these and other aspects of the control apparatus of FIG. 4 in more detail, noting that the buffer 410 itself is omitted from FIG. 5 for clarity of the diagram.

With regard to the notation in FIG. 5, note that values denoted as u(number) represent an unsigned value having that number of bits. Values represented by s(number) represent a signed value having that number of bits.

A subtractor 500 detects the difference 502 between the write pointer 504 and the read pointer 506. This difference 502 represents the current occupancy of the data buffer.

A subtractor 508 detects the difference between the current occupancy 502 and a target occupancy 510. Purely as an example, the target occupancy may be 50% of the buffer size. The outcome 512, a signed value, is provided to a divider 514 and to an absolute value detector 560.

The output of the divider 454, a value 516, is zero if the magnitude of the occupancy difference 512 is less than 64. It will be +1 if the occupancy difference 512 is between 64 and 127, and it will be −1 if the occupancy difference 512 is between −64 and −127 and so on.

A sign bit SGN of the value 512 is provided as an input 518 to a read counter 520. The value 516 is also provided as one input to an adder 522. Other inputs include an input 524 to be discussed below and an input representing a current read shift value to be discussed below.

At the output of the adder 522, a signed 11 bit value is generated as a value 528, from which an overflow indicator OVF 530 (to be discussed below) is provided as another input to the read counter 520, and the remaining magnitude 532 provided as an unsigned 10 bit value to a register 534. The register 534 stores the read shift value 526 as an unsigned 10 bit value. Therefore, the read shift value can vary between 0 and 1023.

The read shift value 526 provides an input to an interpolator 536 in which the read shift value is multiplied (by a multiplier 538) by a data item 540 read from the data buffer location corresponding to the read pointer +1, the product 542 being provided to an adder 544. Another input to the adder 544 is the product, generated by a multiplier 546, of a data item 548 read from the data buffer location corresponding to the read pointer, which is multiplied by (1024−read shift value), as generated by a subtractor.

Note that the multiplications by the multipliers 546, 538 are normalised with respect to the range of 1024 applicable to the 10 bit read shift value. So, the multiplication at 538 is a multiplication by the read shift value/1024, and the multiplication at 546 (shown in FIG. 5 by a shorthand notation "1-x") is a multiplication by ((1024−read shift value)/1024).

This provides an example in which the output control circuitry is configured to progressively vary the read offset displacement by 1/n$^{th}$ of the separation of adjacent data buffer locations at each output data item generation. For example, n may be an integer power of two, greater than 1 (such as $1024=2^{10}$). This feature gives rise to a technique by which the output control circuitry defines an interpolated data buffer location which progresses over the output of a transitional group of data items towards the location pointed to by the target read pointer. For example, the transitional group may comprise 1024 samples.

So, the interpolator is an example of a two-tap interpolator configured to interpolate a data item 552 for output at an interpolated data buffer location display by the read shift value 526 from the data buffer location point to by the read pointer (corresponding to the data item 548). The interpolator can interpolate from a data buffer location pointed to by the read pointer and a data item at an adjacent data buffer location, according to an interpolation ratio defining the interpolated data buffer location between the data buffer location pointed to by the read pointer and the adjacent data buffer location.

So, for example, if the read shift value is zero, then the output data item 552 is equal to the read data item 548 and (in effect at least) an interpolation operation is inhibited and is not applied because there is no contribution from the data item 540. This is the normal quiescent mode of operation of the apparatus, in that a read shift is generated and applied using the techniques to be discussed below only when it is needed, normally temporarily, in response to the buffer becoming too full or too empty, by more than the margin amount.

If the read shift value 526 is (for example) a value of 512 then the output data item 552 is equal to a 50:50 mix of the data items 540, 548, corresponding to an interpolated buffer location halfway between the location pointed to by the read pointer and a next adjacent location.

The read counter 520 advances the read pointer at each read operation according to the truth table shown in FIG. 5. The first two lines of the table show a "normal" advance of one position in response to a read operation. However, if OVF equals 1 and SGN equals 0 then the read pointer advances by +2 places for a single operation, representing a net advance of 1 over its normal trajectory. If OVF equals 1 and SGN equals 1 then the read pointer advances by 0 at a particular stage, representing a net advance of −1 compared to its normal trajectory.

Returning to the occupancy difference value 512, this is also provided to the absolute value detector 560 generating an absolute value 562 or magnitude for the occupancy difference. A detector 564 detects whether this magnitude is less than 64 and provides a signal to an A/VD gate 566 in dependence upon the detection. The signal is a 1 if the absolute value 562 is less than 64, and 0 otherwise.

A comparator 568 compares the read shift amount with 0. If it is greater than 0 than a signal 570 is supplied as a "1" to the A/VD gate 566, and otherwise a 0 is provided. The two inputs to the A/VD gate 566 are combined by a logical A/VD operation to generate a signal 572 which controls the operation of the second 574 of a series of two multiplexers 576, 574.

The multiplexer 576 is controlled by the SGN signal 528 and selects either +1 or −1 in dependence upon the state of SGN. This output is provided to the multiplexer 574 which selects either the output of the multiplexer 574 or 0 as the signal 524.

The effect of the circuitry controlling the generation of the signal 524 is as follows.

If the current occupancy difference has a magnitude less than the margin (such as 64) but the current read shift amount is non-zero, then the input 524 will represent a value +1 or −1 selected (at 576) according to whether the value SGN indicates a positive or negative output from the divider 514. If either the current occupancy difference is greater than the margin, or the current read shift is zero, then the input 524 makes no contribution to the sum generated by the adder 522.

FIGS. 6 to 8b schematically illustrate data states in the apparatus of FIG. 5.

In these diagrams, successive read clock cycles are indicated by successive columns of data. A representation of an excess of write operations over read operations is indicated schematically by two write operations appearing in the same read cycle, but it will be appreciated that such excess write operations do not necessarily align with individual read operations and instead are considered according to their net effect on the balance between write and read operations and the resulting buffer occupancy.

Figure 7:
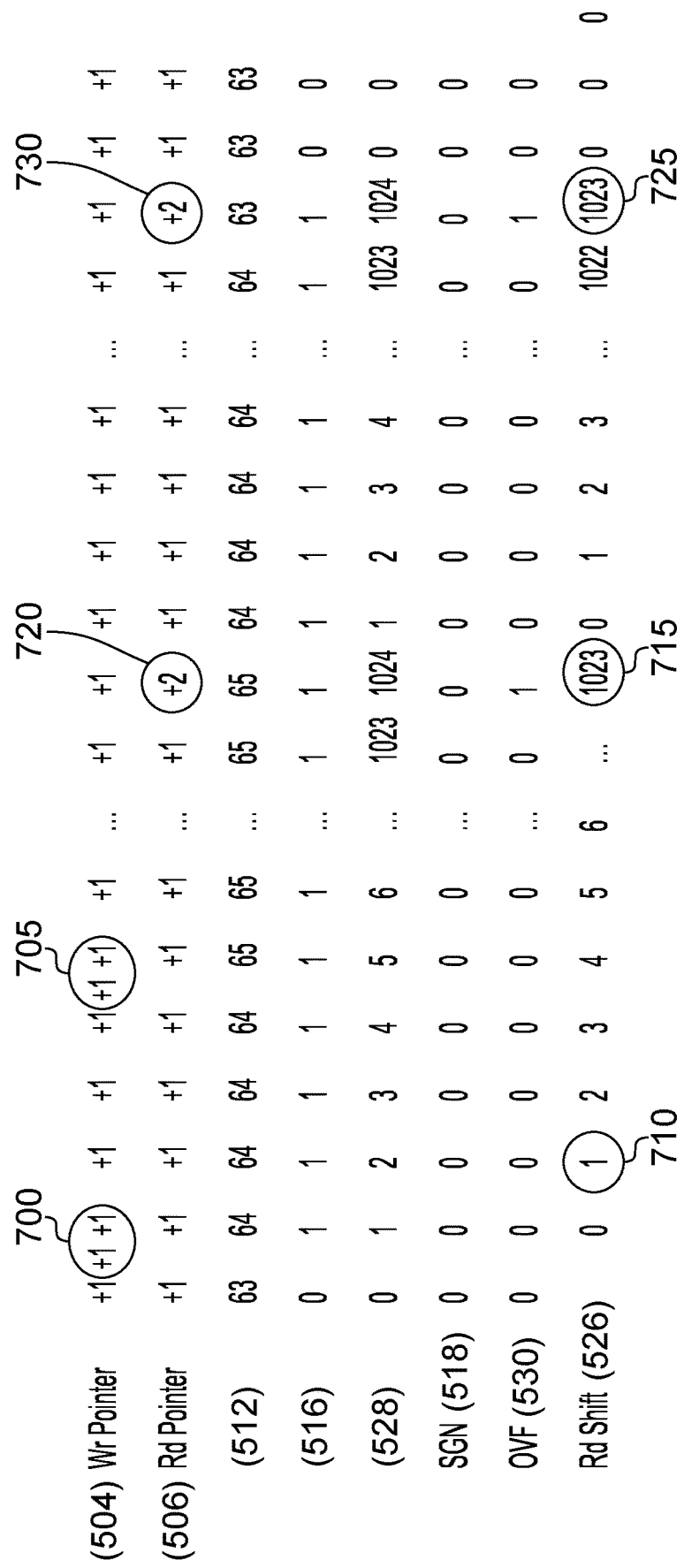

First, FIGS. 6 and 7 concern the situation where data writing is faster than data reading.

Referring to FIG. 6, in the situation where data writing occurs faster than data reading, the buffer occupancy will tend to increase. Assume at the start of FIG. 6 that the occupancy difference 512 has already progressed to be +63.

In a second column of FIG. 6, an extra write operation indicated by a notation 600, compared to the rate of read operations, pushes the value of the signal 512 up to +64. At this point, the signal 516 goes to the plus one and the output 528 of the adder 522 goes to +1.

At the next read/write operation, denoted by the third column of FIG. 6, the read shift value goes to +1 as the register 534 is clocked, shown by the value +1 in the penultimate row (526) of the third column of FIG. 6. This carries on incrementing, once at each read/write operation, each time increasing the read shift value at 1, until a value of 1023 is reached in a column 610 of FIG. 6. The next increment takes the read shift value to 0 (because it is a ten bit counter) but sets the OVF flag as an overflow. This causes the read counter 520 to advance to the read pointer by +2 (a net advance of +1) as shown as a value 620 in FIG. 6. This causes the next read operation to skip one location in the data buffer which means that the value 512 returns to 63, so that the value 516 returns to 0 and the system returns to an effectively non-interpolating (interpolation inhibited) state in which the output data item at each stage depends only on the data item at the current read pointer.

This arrangement demonstrates the action of the register 534 as a cyclic counter configured to generate a count value between 0 and n, the count value being indicative of the read offset displacement, and to change the count value at each output data item generation.

FIG. 7 schematically illustrates another example in which multiple instances 700, 705 are shown of excess write operations. Assume once again that the system starts with the value 512 equal to 63. At the first instance 700 of an excess write operation, the value 512 moves to 64 and, from a next cycle onwards, the read shift value starts incrementing from 1 at a stage 710 as discussed above.

At the next instance 705 of an excess write operation, the value 512 moves up to 65. Read shift continues to increment up to 1023 at a stage 715 however, the signal 528 has reached an overflow situation causing an advance of the read pointer by +2 at a stage 720. The advance at the stage 720 still leaves one net excess write operation to be dealt with so the read shift amount continues to progress back up to 1023 at a stage 725 at which time a further read operation is introduced by advancing the read pointer by +2 at a stage 730. The read shift value returns to zero and the value 512 returns to 63.

Note that an alternative to this operation would be to decrement the Read Shift once buffer occupancy drops below threshold until the Read Shift reaches zero, resulting in a final buffer occupancy of 63, which would of course be within the margin. An option is to continue incrementing if the Read Shift is over 511/1023 and to decrement if below that amount in order to get to the zero position quickest, so as to reduce the number of samples for which interpolation is used. This provides an example of an arrangement in which the output control circuitry is configured, in response to detection by the detector that the current occupancy difference no longer exceeds the threshold occupancy difference, to progressively vary the read offset displacement so as to align the interpolated data buffer location with a given data buffer location.

FIG. 8a concerns an example situation in which data item writing is slower than data item reading, leading to a buffer occupancy which tends towards the lower threshold discussed above. Assume at the start of the process as shown in FIG. 8a, the value 512 has already reached −63. In a second column 800 of FIG. 8, an excess of read operations over write operations leads to the value 512 reaching −64, causing in turn the value 516 to reach −1 and the value 528 to be FFF.

Note that the value 528 is shown here as a 12-bit hexadecimal number using two's complement arithmetic, so −1 decimal is zero x FFF in hexadecimal. In other words, SGN equals 1, OVF equals 1, and the bottom ten bits equal 0x3FF or 1023 decimal.

As the OVF bit has been set and the SGN has been set, the read pointer increments by plus zero or a net decrement of one, so the value 512 returns to −63, the value 516 goes to zero and the value 524 goes to −1. The value 528 goes to 3FE. The value 528 keeps on decrementing so that the read shift value 526 goes from 1023 down towards zero. At the last column 810 of FIG. 8, therefore, the system returns to an effectively non-interpolating state.

Accordingly, interpolation can be inhibited in these examples by setting Read Shift=0.

FIG. 8b concerns a situation in which writing is briefly faster than reading, and schematically illustrates another example where an excess write operation in column 820 causes the occupancy to briefly exceed the threshold, returning back down by virtue of an excess read operation (missed write operation) at a stage 830. Operation continues in a similar way to that described above for FIG. 6 but the resulting buffer occupancy is further within the threshold (that is to say, ending up at 62) due to the missed write operation.

Figure 9:
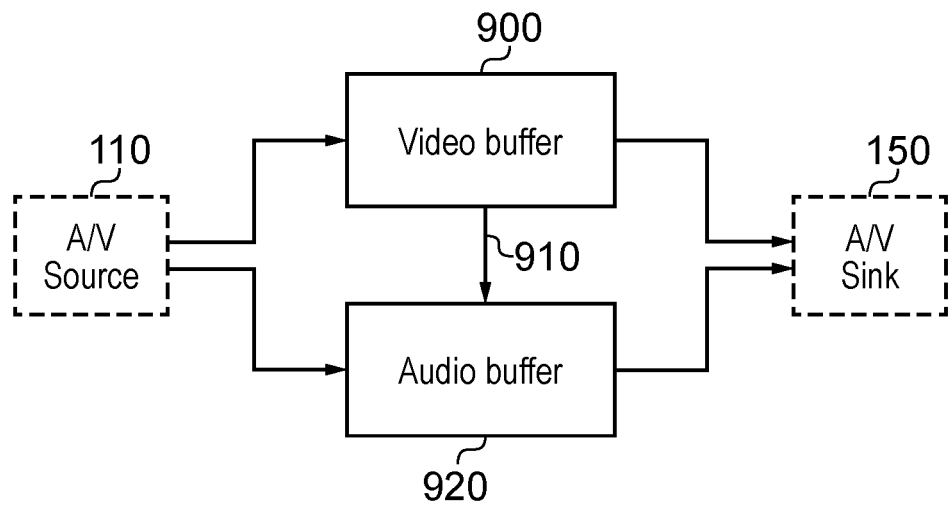
FIG. 9 schematically illustrates an alternative video and audio buffer arrangement.

FIG. 9 schematically illustrates an alternative video and audio buffer arrangement, again providing buffering between an A/V source 110 and an A/V sink 150. Here, the video buffer 900 provides a control signal 910 to the audio buffer 920. Techniques by which a control signal may be generated and used will be discussed below.

Figure 10:
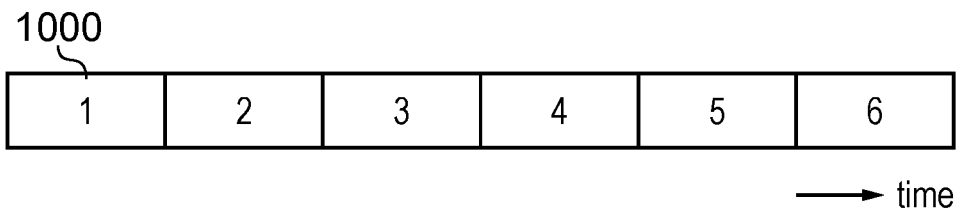
FIG. 10 schematically illustrates a frame skip or repeat operation.

FIG. 10 schematically illustrates the background of a frame skip or repeat operation. The boxes 1000 in FIG. 10 represent successive video frames with time progressing towards the right hand side of FIG. 10. These are frames as stored in the video buffer 900. To cater for rate changes as discussed above, in a video buffer it is generally necessary to skip or repeat video frames, so that for example the output frame order may be for example 1, 2, 3, 5, 6 . . . in the case of a frame skip operation or 1, 2, 3, 4, 4, 5, 6 . . . in the case of a frame repeat operation. Techniques to be discussed below will make use of the fact that the video buffer is able to detect, in advance of a frame repeat or frame skip operation, that such an operation is likely to be necessary and the audio buffer 920 can initiate changes to the output data rates to accommodate such a change.

Figure 11:
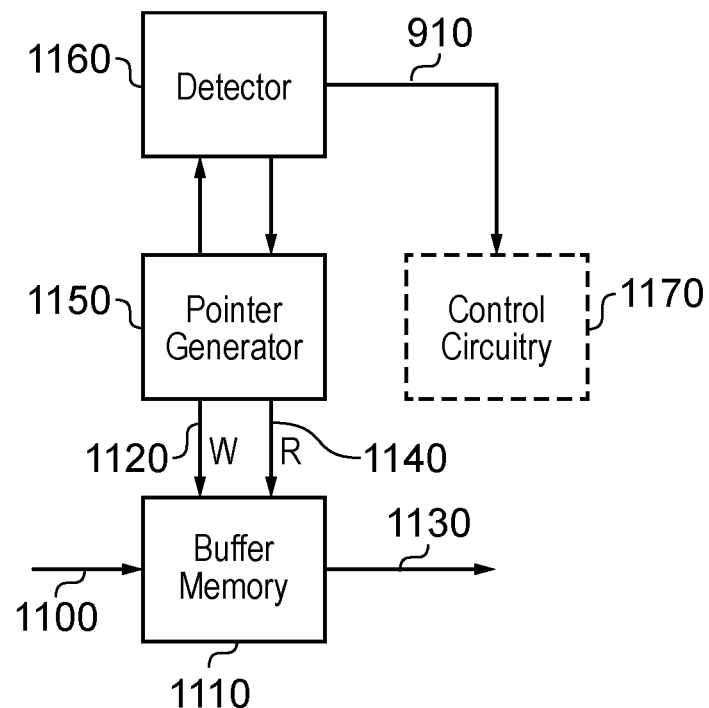
FIG. 11 schematically illustrates a video buffer control apparatus.

FIG. 11 schematically illustrates a part of the operation of the video buffer 900 including control circuitry to control operation of the video buffer 900. Input video data 1100 are provided to a buffer memory 1110 according to a write pointer 1120 and are read as output data 1130 according to a read pointer 1140. Circuitry 1150 generates the pointers and a detector 1160 detects the current occupancy of the buffer memory 1110. If this occupancy is currently acceptable but is heading towards being insufficient, then a frame repeat operation can be scheduled, for example, at a next or other future frame period. If the buffer occupancy is excessive but still acceptable, then a frame skip operation can be scheduled for, say, the next or other future frame period.

A frame skip or frame repeat operation causes a disruption in the audio signal of one frame's worth of audio data, for example 800 samples in a 48 kHz audio sample rate and 60 video frames per second system. Notice of this advance scheduling of a repeat or skip operation is provided to the audio buffer as the signal 900, and at the audio buffer (a part of which is shown as circuitry 1170, it is used to initiate the dropping or repeating of multiple audio samples and the control of read operations at the audio buffer in a similar manner to that discussed above, in order to adapt the output audio signal to the timing transition caused by the dropping or repeating of a video frame, with the aim of re-aligning the audio signal (at least after a transitional period) with the video signal so as to maintain so-called lip synchronisation.

Figure 12:
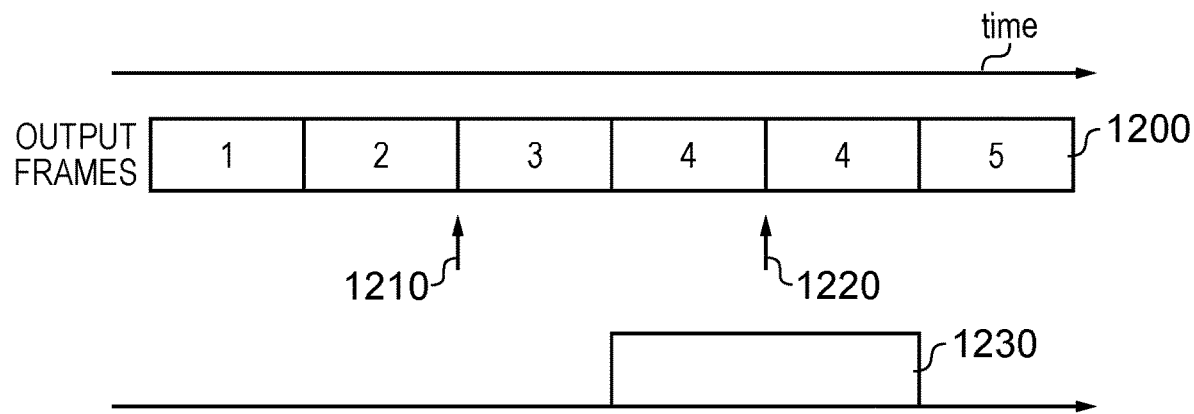
FIGS. 12 and 13 schematically illustrate an audio buffering adjustment process.
Figure 13:
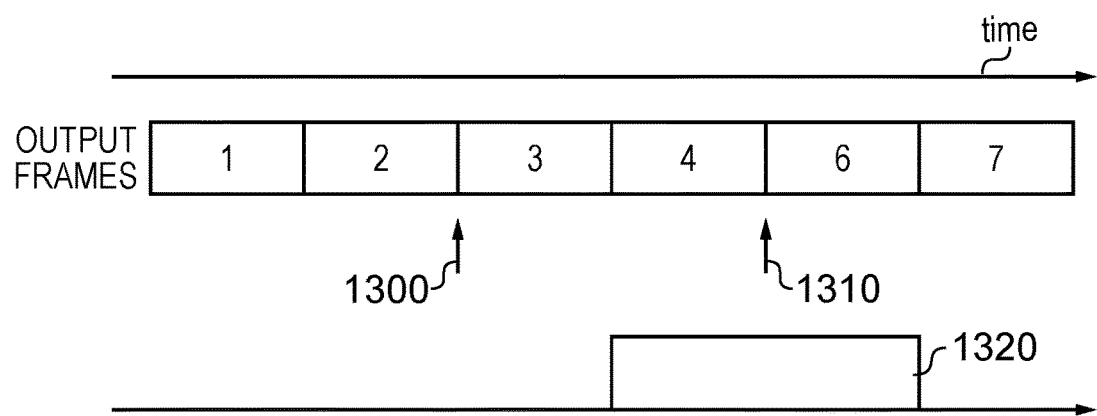

The rate control at the audio buffer can itself be carried out over a transitional period. FIGS. 12 and 13 schematically illustrate this arrangement, in which time progresses from left to right of the diagram. In the output 1200 of video frames, the detector 1160 detects at a future time point 1210 that a frame repeat operation will be needed at a time point 1220 and provides the signal 910 to the audio buffer to indicate this. The audio buffer initiates the dropping of one video frame's worth of audio samples, but over an extended transitional period 1230 so as to reduce the audible effects for the user. The transitional period is shown schematically as lasting for two frames as a schematic representation but in reality might last (for example) up to a second or a few seconds of audio.

Similarly, in FIG. 13, at a time point 1300, the detector 1160 detects that a frame skip operation will be required at a time point 1310 and communicates this to the audio buffer. The audio buffer initiates a transitional period 1320 of adjustment in the rate of reading audio data from the audio buffer.

Therefore, FIGS. 11 to 13 provide examples of the use of a video buffer; and a video buffer controller configured to detect the occupancy of the video buffer and, in response to the detection, to initiate the dropping or repeating of a video frame for output by the video buffer; in which the output control circuitry 430 is responsive to the video buffer controller to compensate, over a transitional period, for a net reduction or increase in the output data rate in response to the dropping or repeating of a video frame. For example, as shown in FIGS. 12 and 13, the output control circuitry may be configured to start the transitional period before the dropping or repeating of the video frame.

The examples above concern a target occupancy of 50% of the buffer size and a margin in this example of 64 samples. However, both of these are configurable parameters of the apparatus. Indeed, in some examples the margin could be 1 sample but this could lead to near-continuous interpolation by the apparatus even for very tiny discrepancies in input and output data rates. But more generally, an event detector 1400 (FIG. 14) can detect events in an indicative signal 1410, and controls a target generator 1420 and a margin generator 1430 to generate respectively a target occupancy and a margin for supply to the apparatus of FIG. 5. The target occupancy is supplied as an input to the subtractor 508. The margin is supplied as a parameter to the divider 514 and the detector 564. Examples of the types of events that can be relative to this arrangement include:

a detection of an abrupt change in input or output data rate; or a detection that data at another input (in a multiple input system) is unsynchronised with the data handled by the present buffer.

Figure 14:
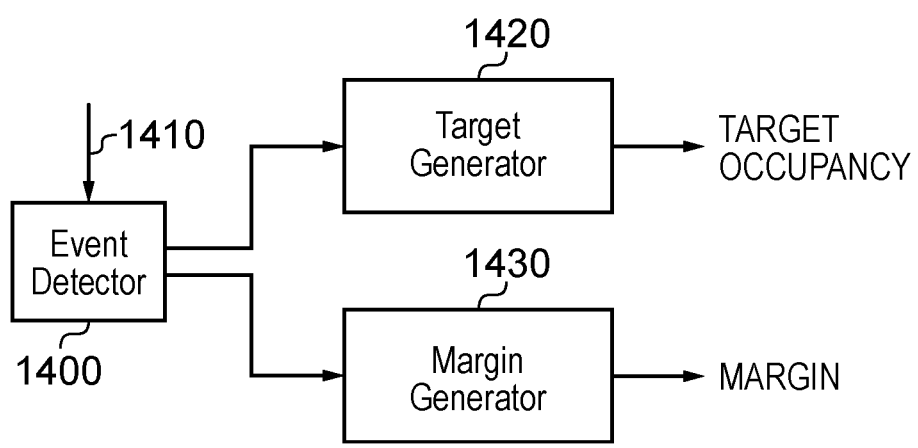
FIG. 14 schematically illustrates an event detector.

FIG. 14 therefore provides an example of the use of an event detector configured to detect an event of a set of one or more predetermined events, and a controller configured to control one or both of the target buffer occupancy and the threshold occupancy difference in response to a detected event.

Figure 15:
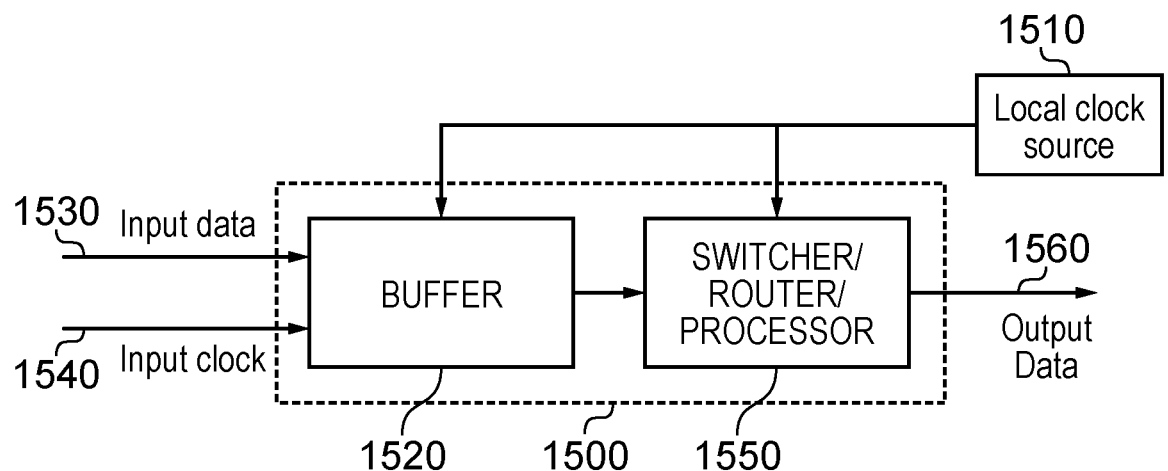
FIGS. 15 to 17 schematically illustrate example applications of data buffer control.
Figure 16:
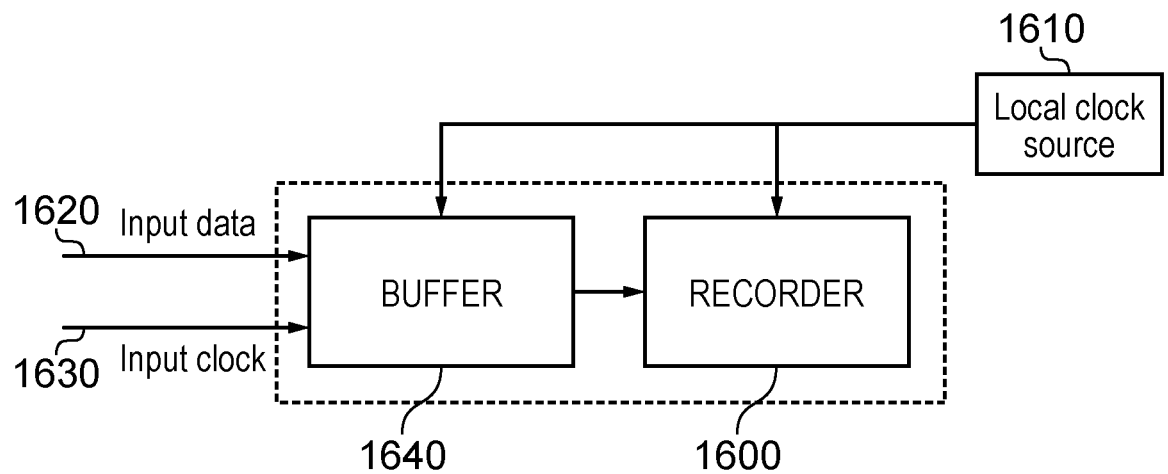
Figure 17:
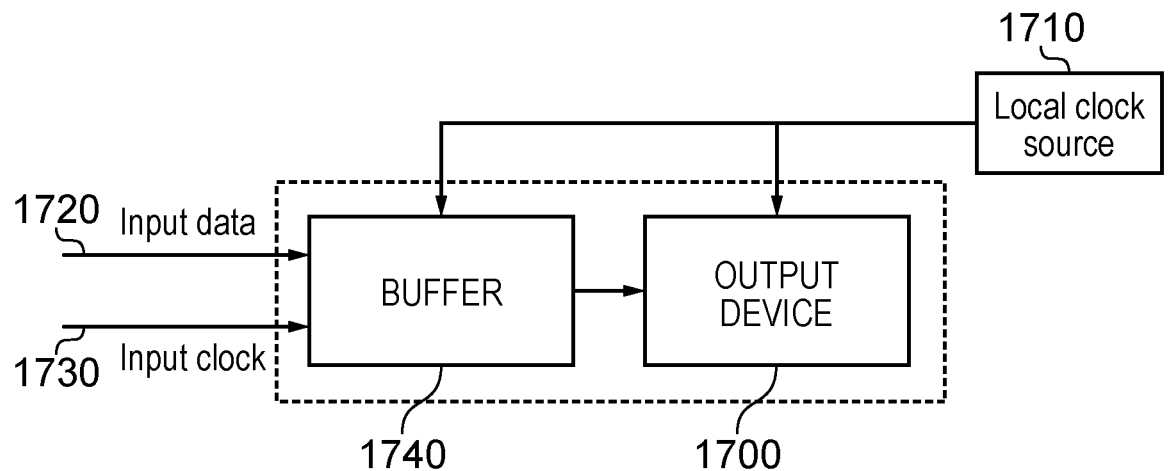

FIGS. 15 to 17 schematically illustrate example applications of data buffer control of this type.

FIG. 15 schematically represents switching/routing/processing apparatus 1500 operating under the control of a local clock source 1510 in which a buffer 1520 operating as discussed above in used to accommodate differences in data rate between input data 1530 according to an input clock 1540 and the operations of the switcher/router/processor 1550 and the output of data 1560 controlled by the local clock source 1510.

FIGS. 16 and 17 schematically illustrate similar arrangements, but in which, for example, recording operations by a recorder 1600 or output operations (display, audible output or the like) by an output device 1700 are under the control of a respective local clock source 1610, 1710, whereas input data 1620, 1720 is received according to an input clock signal 1630, 1730. As before a buffer 1640, 1740 caters for differences between the input data rate and the output data rate required by the recorder 1600 or the output device 1700.

Figure 18:
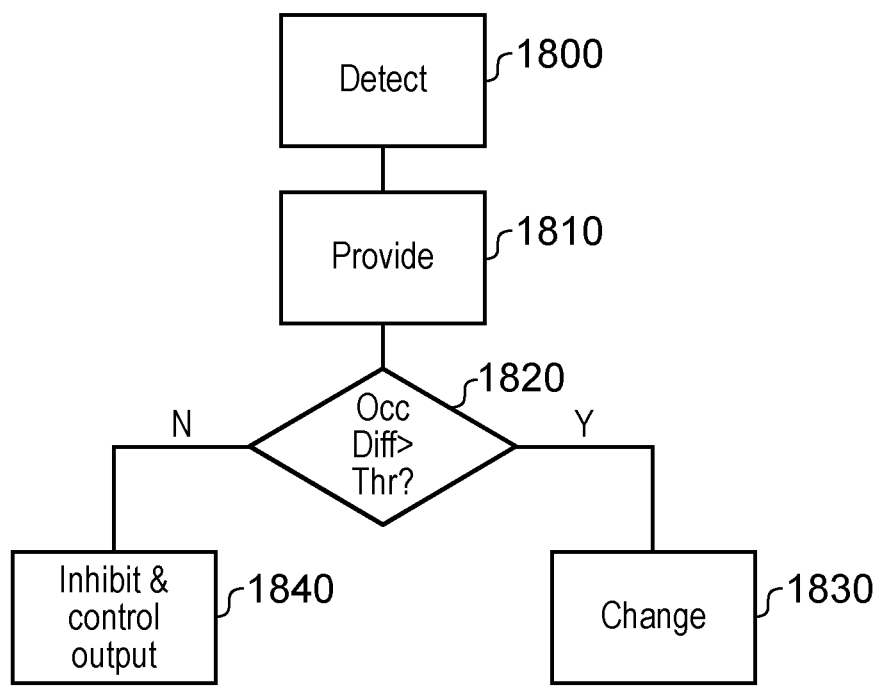
FIG. 18 is a schematic flowchart illustrating a method.

FIG. 18 is a schematic flowchart illustrating a method of controlling operation of a data buffer to which data items are written according to a write pointer which advances in position in response to an input data item rate and from which data items are read according to a read pointer which advances in position in response to an output data item rate, the method comprising:

detecting (at a step 1800) an occupancy difference between a current buffer occupancy and a target buffer occupancy, in which the current buffer occupancy represents a difference between the read and write pointers;

providing (at a step 1810) an output data item interpolator to interpolate a data item at an interpolated data buffer location displaced by a read offset displacement from the data buffer location pointed to by the read pointer;

at a step 1820, in response to a current occupancy difference exceeding a threshold occupancy difference (Thr), changing (at a step 1830) the read pointer from an initial read pointer to a target read pointer by a change amount so as to reduce the occupancy difference, by progressively varying the read offset displacement so as to define an interpolated data buffer location which progresses over the output of a transitional group of data items towards the location pointed to by the target read pointer; and when (at a step 1840) the occupancy difference is less than the threshold occupancy difference and the interpolated data buffer location is aligned with the target read pointer (implied by no longer being under the control of the step 1830), inhibiting operation of the output data item interpolator and controlling output of an output data item from the data buffer location pointed to by the read pointer.

FIGS. 19*a* to 19*d* schematically illustrate options relating to the handling of interpolation in the arrangements discussed above.

Figure 19A:
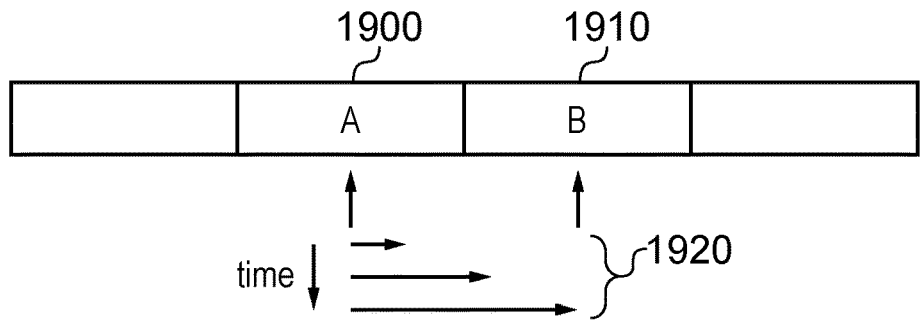
FIGS. 19*a* to 19*d* schematically illustrate method options.
Figure 19B:
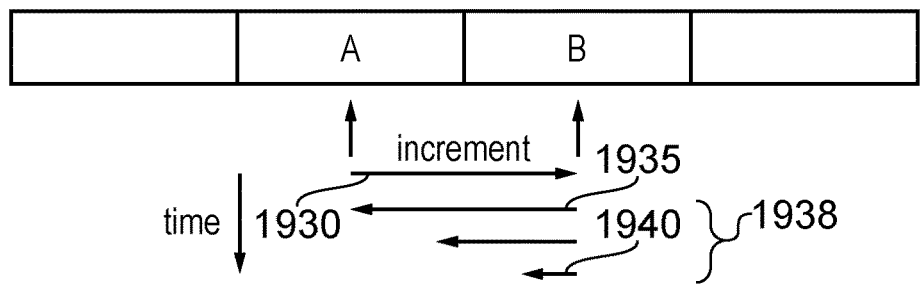

FIGS. 19*a* and 19*b* schematically illustrate techniques for gradually advancing the read pointer position forward by one buffer position (from an initial position shown schematically as "A" 1900 to a target position shown schematically as "B" 1910). In these two cases (FIGS. 19*a* and 19*b*), the net effect of an excess of write data over read data is that the read pointer 1900 has to be advanced to a next position 1910. As discussed above, this takes place over a transitional group of (in this example) 1024 samples.

One option, as shown in FIG. 19*a*, is to initially keep the read pointer the same and advance the read shift gradually from the position 1900 to the position 1910, and when the position 1910 is reached the read pointer is incremented and interpolation inhibited or switched off. The gradual advance of the interpolation position is represented schematically in FIG. 19*a* by a series 1920 of lengthening arrows. The series 1950 (and indeed the series 1938, 1950, 1970 described below, provide examples of progressively varying the read offset displacement (represented by the combined effect of the arrow 1930, 1960 and the series which follows, in the case of FIGS. 19*b* and 19*d*) so as to define an interpolated data buffer location which progresses over the output of a transitional group of data items towards the location pointed to by the target read pointer.

In another example, the read pointer is incremented straight away (as shown by a schematic arrow 1930) and a read shift of −1023/1024 is applied 1935, steadily increasing in magnitude (and negative polarity) towards a zero interpolation (represented schematically by a smaller arrow 1940) at the end of a series 1938 representing this process.

Note that in either FIG. 19*a* or FIG. 19*b* there is a net read offset displacement which is increasing in magnitude with time and which is oriented to the right (towards the target read pointer position) as drawn. In FIG. 19*a*, this is represented by the read offset value 526, and in FIG. 19*b* (in which a pointer increment takes place first followed by progressively reducing read offset values) the read offset displacement is represented by 1 (or 1024 taking into account the normalisation) plus the read shift value (noting that in FIG. 19*b* the read shift value represents a negative value or shift to the left as drawn).

Figure 19C:
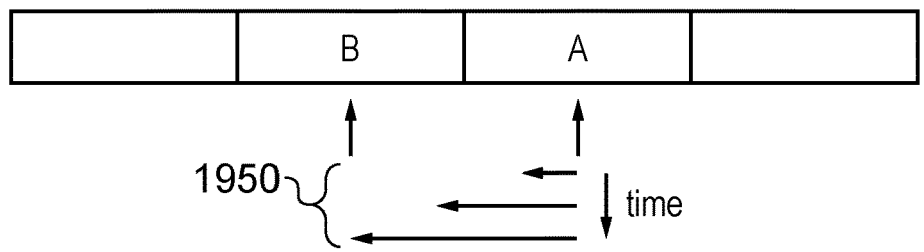
Figure 19D:
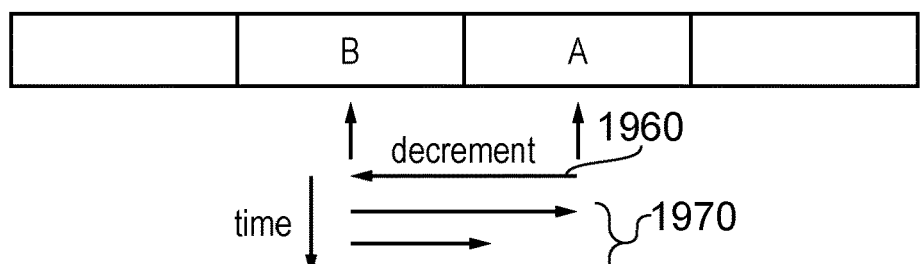

FIGS. 19*c* and 19*d* schematically represent similar options applicable to a net advance of −1 in the read pointer position (from "A" 1900 to "B" 1910 in FIGS. 19*c* and 19*d*).

In FIG. 19*c*, to move the read pointer backwards by one position in the buffer, it would be possible to start from a current read pointer position and apply a successive read shift of −1, −2 . . . −1023/1024, to end up at the target read pointer position 1910. This is represented in FIG. 19*c* as a series 1950 of arrows.

However, in other examples, the read pointer is initially decremented (represented by a schematic arrow 1960) to the target position 1910 and then a positive read shift +1023 is applied, reducing down in a progression 1970 to +1, 0 interpolation at which point interpolation is effectively switched off.

Note again that in either FIG. 19*c* or FIG. 19*d* there is a net read offset displacement which is increasing in magnitude with time and which is oriented to the left (towards the target read pointer position) as drawn. In FIG. 19*c*, this is represented by the read offset value 526, which has a negative (leftwards) sense as drawn, and in FIG. 19*d* (in which a pointer increment takes place first followed by progressively reducing read offset values) the read offset displacement is represented by −1 (or −1024 taking into account the normalisation) plus the read shift value (noting that in FIG. 19*d* the read shift value represents a positive shift to the right as drawn)

The example of FIG. 5 uses the arrangements of FIGS. 19*a* and 19*d*, but other embodiments could use any combination of (FIG. 19*a* or 19*b*) and (FIG. 19*c* or 19*d*).

FIGS. 19*b* and 19*d* provide examples in which the output control circuitry 430 is configured to change the read pointer from an initial read pointer to a target read pointer by first applying the change amount to the read pointer and then applying an offset having an opposite polarity to the change amount and a progressively reducing magnitude, the read offset displacement representing a sum of the change amount and the applied offset.

FIGS. 19*a* and 19*c* provide examples in which the output control circuitry is configured to change the read pointer from an initial read pointer to a target read pointer by applying a read offset displacement having the same polarity as the change amount and a progressively increasing magnitude.

Figure 20:
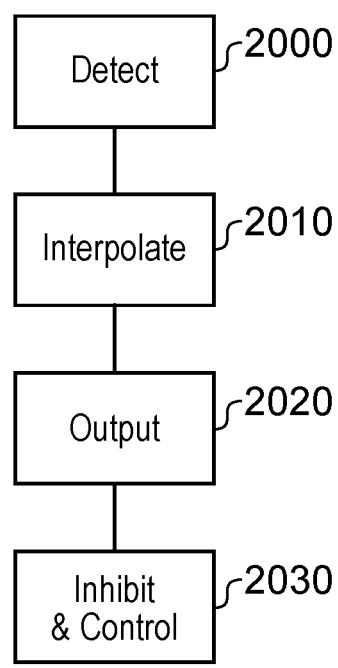
FIG. 20 is a schematic flowchart illustrating a method.

FIG. 20 is a schematic flowchart illustrating a method of controlling operation of a data buffer to which data items are written according to a write pointer which advances in position in response to an input data item rate and from which data items are read according to a read pointer which advances in position in response to an output data item rate, the method comprising:

detecting (at a step 2000) an occupancy difference between a current buffer occupancy and a target buffer occupancy, in which the current buffer occupancy represents a difference between the read and write pointers;

interpolating (at a step 2010) a data item at an interpolated data buffer location displaced by a read offset displacement from a data buffer location pointed to by the read pointer;

outputting (at a step 2020) an interpolated data item so as to reduce the occupancy difference; and when the occupancy difference is less than the threshold occupancy difference, inhibiting (at a step 2030) the interpolating step and controlling output of an output data item from the data buffer location pointed to by the read pointer.

Further embodiments of the disclosure (for example, as represented by FIG. 5 described above) provide for:

Control apparatus to control operation of a data buffer to which data items are written according to a write pointer which advances in position in response to an input data item rate and from which data items are read according to a read pointer which advances in position in response to an output data item rate, the apparatus comprising:

a detector configured to detect an occupancy difference between a current buffer occupancy and a target buffer occupancy, in which the current buffer occupancy represents a difference between the read and write pointers;

an output data item interpolator configured to interpolate a data item at an interpolated data buffer location displaced by a read offset displacement from the data buffer location pointed to by the read pointer; and output control circuitry configured to output an interpolated data item so as to reduce the occupancy difference and when the occupancy difference is less than the threshold occupancy difference to inhibit operation of the output data item interpolator and to control output of an output data item from the data buffer location pointed to by the read pointer.

Further embodiments provide that the inhibiting of the output data item interpolator is when the occupancy difference is less than the threshold occupancy difference and the interpolated data buffer location is aligned with a target read pointer.

Respective aspects and features of the present disclosure are defined by the following numbered clauses:

1. Control apparatus to control operation of a data buffer to which data items are written according to a write pointer which advances in position in response to an input data item rate and from which data items are read according to a read pointer which advances in position in response to an output data item rate, the apparatus comprising:

a detector configured to detect an occupancy difference between a current buffer occupancy and a target buffer occupancy, in which the current buffer occupancy represents a difference between the read and write pointers;

an output data item interpolator configured to interpolate a data item at an interpolated data buffer location displaced by a read offset displacement from a data buffer location pointed to by the read pointer; and output control circuitry configured, in response to a current occupancy difference exceeding a threshold occupancy difference, to change the read pointer from an initial read pointer to a target read pointer by a change amount so as to reduce the occupancy difference, the output control circuitry being configured to progressively vary the read offset displacement so as to define an interpolated data buffer location which progresses over the output of a transitional group of data items towards the location pointed to by the target read pointer;

the output control circuitry being further configured, when the occupancy difference is less than the threshold occupancy difference and the interpolated data buffer location is aligned with the target read pointer, to inhibit operation of the output data item interpolator and to control output of an output data item from the data buffer location pointed to by the read pointer.

2. Control apparatus according to clause 1, in which the output control circuitry is configured to change the read pointer from an initial read pointer to a target read pointer by first applying the change amount to the read pointer and then applying an offset having an opposite polarity to the change amount and a progressively reducing magnitude, the read offset displacement representing a sum of the change amount and the applied offset.

3. Control apparatus according to clause 1 or clause 2, in which the output control circuitry is configured to change the read pointer from an initial read pointer to a target read pointer by applying a read offset displacement having the same polarity as the change amount and a progressively increasing magnitude.

4. Control apparatus according to any one of clauses 2 and 3, in which the output control circuitry is configured to progressively vary the read offset displacement by $1/n^{th}$ of the separation of adjacent data buffer locations at each output data item generation.

5. Control apparatus according to clause 4, in which n is an integer power of two, greater than 1.

6. Control apparatus according to clause 5, in which the output control circuitry comprises a cyclic counter configured to generate a count value between 0 and n, the count value being indicative of the read offset displacement, and to change the count value at each output data item generation.

7. Control apparatus according to any one of the preceding clauses, in which the threshold occupancy difference is more than one data item.

8. Control apparatus according to any one of the preceding clauses, in which the input data item rate is defined by an input clock signal and the output data item rate is defined by an output clock signal.

9. Control apparatus according to any one of the preceding clauses, in which the interpolator is a two-tap interpolator configured to interpolate between a data item at the data buffer location pointed to by the read pointer and a data item at an adjacent data buffer location, according to an interpolation ratio defining the interpolated data buffer location between the data buffer location pointed to by the read pointer and the adjacent data buffer location.

10. Control apparatus according to any one of the preceding clauses, comprising an event detector configured to detect an event of a set of one or more predetermined events, and a controller configured to control one or both of the target buffer occupancy and the threshold occupancy difference in response to a detected event.

11. Control apparatus according to any one of the preceding clauses, in which the output control circuitry is configured, in response to detection by the detector that the current occupancy difference no longer exceeds the threshold occupancy difference, to progressively vary the read offset displacement so as to align the interpolated data buffer location with a given data buffer location.

12. Data buffer apparatus comprising:
a data buffer; and
control apparatus according to any one of the preceding clauses, to control operation of the data buffer.

13. Apparatus according to clause 12, in which the data items are audio samples.

14. Apparatus according to clause 12 or clause 13, comprising:
a video buffer; and
a video buffer controller configured to detect the occupancy of the video buffer and, in response to the detection, to initiate the dropping or repeating of a video frame for output by the video buffer;
in which the output control circuitry is responsive to the video buffer controller to compensate, over a transitional period, for a net reduction or increase in the output data rate in response to the dropping or repeating of a video frame.

15. Apparatus according to clause 14, in which the output control circuitry is configured to start the transitional period before the dropping or repeating of the video frame.

16. A method of controlling operation of a data buffer to which data items are written according to a write pointer which advances in position in response to an input data item rate and from which data items are read according to a read pointer which advances in position in response to an output data item rate, the method comprising:
detecting an occupancy difference between a current buffer occupancy and a target buffer occupancy, in which the current buffer occupancy represents a difference between the read and write pointers;
providing an output data item interpolator to interpolate a data item at an interpolated data buffer location displaced by a read offset displacement from a data buffer location pointed to by the read pointer;
in response to a current occupancy difference exceeding a threshold occupancy difference, changing the read pointer from an initial read pointer to a target read pointer by a change amount so as to reduce the occupancy difference, by progressively varying the read offset displacement so as to define an interpolated data buffer location which progresses over the output of a transitional group of data items towards the location pointed to by the target read pointer; and
when the occupancy difference is less than the threshold occupancy difference and the interpolated data buffer location is aligned with the target read pointer, inhibiting operation of the output data item interpolator and controlling output of an output data item from the data buffer location pointed to by the read pointer.

17. Control apparatus to control operation of a data buffer to which data items are written according to a write pointer which advances in position in response to an input data item rate and from which data items are read according to a read pointer which advances in position in response to an output data item rate, the apparatus comprising:
a detector configured to detect an occupancy difference between a current buffer occupancy and a target buffer occupancy, in which the current buffer occupancy represents a difference between the read and write pointers;

an output data item interpolator configured to interpolate a data item at an interpolated data buffer location displaced by a read offset displacement from a data buffer location pointed to by the read pointer; and output control circuitry configured to output an interpolated data item so as to reduce the occupancy difference and when the occupancy difference is less than the threshold occupancy difference to inhibit operation of the output data item interpolator and to control output of an output data item from the data buffer location pointed to by the read pointer.

18. Control apparatus according to clause 17, in the output control circuitry is configured to inhibit the output data item interpolator is when the occupancy difference is less than the threshold occupancy difference and the interpolated data buffer location is aligned with a target read pointer.

19. A method of controlling operation of a data buffer to which data items are written according to a write pointer which advances in position in response to an input data item rate and from which data items are read according to a read pointer which advances in position in response to an output data item rate, the method comprising:

detecting an occupancy difference between a current buffer occupancy and a target buffer occupancy, in which the current buffer occupancy represents a difference between the read and write pointers;

interpolating a data item at an interpolated data buffer location displaced by a read offset displacement from a data buffer location pointed to by the read pointer;

outputting an interpolated data item so as to reduce the occupancy difference; and when the occupancy difference is less than the threshold occupancy difference, inhibiting the interpolating step and controlling output of an output data item from the data buffer location pointed to by the read pointer.

It will be appreciated that in example embodiments the techniques discussed above, including the method represented by FIG. 18 or FIG. 20, can be implemented by computer software or other instructions operating on a general purpose computing system such as a field programmable gate array (FPGA) or by configurable circuitry such as an application specific integrated circuit (ASIC). In these examples, computer software or configuration instructions, which when executed by such apparatus (which may be considered as a computer), causes the apparatus to carry out any of the methods discussed above is considered as an embodiment of the present disclosure. Similarly, embodiments of the disclosure are provided by a non-transitory, machine-readable storage medium which stores such computer software or configuration instructions.

It will also be apparent that numerous modifications and variations of the present disclosure are possible in light of the above teachings. It is therefore to be understood that within the scope of the appended claims, the disclosure may be practised otherwise than as specifically described herein.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

The invention claimed is:

1. A control apparatus configured to control operation of a data buffer to which data items are written according to a write pointer that advances in position in response to an input data item rate, and from which data items are read according to a read pointer that advances in position in response to an output data item rate, the control apparatus comprising:

detection circuitry configured to detect an occupancy difference between a current buffer occupancy and a target buffer occupancy, wherein the current buffer occupancy represents a difference between the read and write pointers;

output data item interpolation circuitry configured to interpolate a data item at an interpolated data buffer location, which is defined by a read offset displacement from a data buffer location pointed to by the read pointer; and output control circuitry configured to, in response to determining that a current occupancy difference exceeds a threshold occupancy difference, change the read pointer from an initial read pointer to a target read pointer by a change amount so as to reduce the occupancy difference, the output control circuitry being further configured to, in response to changing the read pointer by the change amount, progressively vary the read offset displacement by progressively applying an offset having an opposite polarity from the change amount so as to define the interpolated data buffer location, which progressively changes over output of a transitional group of data items towards a location pointed to by the target read pointer, wherein the output control circuitry is further configured to, when the occupancy difference is less than the threshold occupancy difference and the interpolated data buffer location is aligned with the target read pointer, inhibit operation of the output data item interpolation circuitry and control output of an output data item from the data buffer location pointed to by the read pointer.

2. The control apparatus according to claim 1, wherein the output control circuitry is further configured to progressively vary the read offset displacement by 1/nth of a separation of adjacent data buffer locations at each output data item generation.

3. The control apparatus according to claim 2, wherein n is an integer power of two, greater than 1.

4. The control apparatus according to claim 3, wherein the output control circuitry comprises a cyclic counter configured to generate a count value between 0 and n, the count value being indicative of the read offset displacement, and to change the count value at each output data item generation.

5. The control apparatus according to claim 1, wherein the threshold occupancy difference is more than one data item.

6. The control apparatus according to claim 1, wherein the input data item rate is defined by an input clock signal and the output data item rate is defined by an output clock signal.

7. The control apparatus according to claim 1, wherein the output data item interpolation circuitry is a two-tap interpolator configured to interpolate between a data item at the data buffer location pointed to by the read pointer and a data item at an adjacent data buffer location, according to an interpolation ratio defining the interpolated data buffer location between the data buffer location pointed to by the read pointer and the adjacent data buffer location.

8. The control apparatus according to claim 1, further comprising event detection circuitry configured to detect an event of a set of one or more predetermined events, and a controller configured to control one or both of the target buffer occupancy and the threshold occupancy difference in response to the detected event.

9. The control apparatus according to claim 1, wherein the output control circuitry is further configured to, in response to detection by the detection circuitry that the current occupancy difference no longer exceeds the threshold occupancy difference, progressively vary the read offset displacement so as to align the interpolated data buffer location with a given data buffer location.

10. The control apparatus of claim 1, wherein the output control circuitry is configured to progressively apply the offset having the opposite polarity from the change amount so as to define the interpolated data buffer location, which progressively changes with a same polarity as the change amount.

11. A data buffer apparatus, comprising:
a data buffer; and
the control apparatus according to claim 1, to control operation of the data buffer.

12. The data buffer apparatus according to claim 11, wherein the data items are audio samples.

13. The data buffer apparatus according to claim 12, further comprising:
a video buffer; and
a video buffer controller configured to detect occupancy of the video buffer, and, in response to the detection, initiate dropping or repeating of a video frame for output by the video buffer,
wherein the output control circuitry is responsive to the video buffer controller to compensate, over a transitional period, for a net reduction or increase in an output data rate, in response to the dropping or the repeating of a video frame.

14. The data buffer apparatus according to claim 13, wherein the output control circuitry is further configured to start the transitional period before the dropping or the repeating of the video frame.

15. A method, comprising:
controlling operation of a data buffer to which data items are written according to a write pointer that advances in position in response to an input data item rate, and from which data items are read according to a read pointer that advances in position in response to an output data item rate;
detecting an occupancy difference between a current buffer occupancy and a target buffer occupancy, wherein the current buffer occupancy represents a difference between the read and write pointers;
interpolating, by output data item interpolation circuitry, a data item at an interpolated data buffer location, which is defined by a read offset displacement from a data buffer location pointed to by the read pointer;
in response to a current occupancy difference exceeding a threshold occupancy difference, changing the read pointer from an initial read pointer to a target read pointer by a change amount so as to reduce the occupancy difference, and, in response to changing the read pointer by the change amount, progressively varying the read offset displacement by progressively applying an offset having an opposite polarity from the change amount so as to define the interpolated data buffer location, which progressively changes over the output of a transitional group of data items towards a location pointed to by the target read pointer; and
when the occupancy difference is less than the threshold occupancy difference and the interpolated data buffer location is aligned with the target read pointer, inhibiting operation of the output data item interpolation circuitry and controlling output of an output data item from the data buffer location pointed to by the read pointer.

16. A control apparatus configured to control operation of a data buffer to which data items are written according to a write pointer that advances in position in response to an input data item rate, and from which data items are read according to a read pointer that advances in position in response to an output data item rate, the control apparatus comprising:
detection circuitry configured to detect an occupancy difference between a current buffer occupancy and a target buffer occupancy, wherein the current buffer occupancy represents a difference between the read and write pointers;
output data item interpolation circuitry configured to interpolate a data item at an interpolated data buffer location, which is defined by a read offset displacement from a data buffer location pointed to by the read pointer, wherein the output control circuitry is further configured to change the read pointer from an initial read pointer to a target read pointer by progressively changing the read offset displacement to have a progressively increasing magnitude; and
output control circuitry configured to output an interpolated data item so as to reduce the occupancy difference, and when the occupancy difference is less than the threshold occupancy difference, inhibit operation of the output data item interpolation circuitry and control output of an output data item from the data buffer location pointed to by the read pointer.

17. The control apparatus according to claim 16, wherein the output control circuitry is further configured to inhibit the output data item interpolation circuitry when the occupancy difference is less than the threshold occupancy difference and the interpolated data buffer location is aligned with a target read pointer.

18. The control apparatus of claim 16, wherein the output control circuitry is further configured to inhibit operation of the output data item interpolation circuitry based only on determining that the occupancy difference is less than the threshold occupancy difference.

* * * * *